United States Patent
Vineyard et al.

(10) Patent No.: US 12,105,612 B1
(45) Date of Patent: Oct. 1, 2024

(54) ALGORITHMIC ARCHITECTURE CO-DESIGN AND EXPLORATION

(71) Applicant: National Technology & Engineering Solutions of Sandia, LLC, Albuquerque, NM (US)

(72) Inventors: Craig Michael Vineyard, Cedar Crest, NM (US); Sam Green, Los Altos, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 454 days.

(21) Appl. No.: 17/461,847

(22) Filed: Aug. 30, 2021

Related U.S. Application Data (60) Provisional application No. 63/072,827, filed on Aug. 31, 2020.

(51) Int. Cl.
*G06F 11/34* (2006.01)
*G06N 3/04* (2023.01)
*G06N 3/10* (2006.01)

(52) U.S. Cl.
CPC .......... *G06F 11/3442* (2013.01); *G06N 3/04* (2013.01); *G06N 3/10* (2013.01)

(58) Field of Classification Search
CPC ......... G06F 11/3442; G06N 3/04; G06N 3/10
See application file for complete search history.

(56) References Cited

U.S. PATENT DOCUMENTS

2019/0096038 A1* 3/2019 El-Khamy ................ G06T 5/70

\* cited by examiner

*Primary Examiner* — Walter L Lindsay, Jr.
*Assistant Examiner* — Geoffrey T Evans
(74) *Attorney, Agent, or Firm* — Yee & Associates, P.C.; Gregory M. Doudnikoff (57) ABSTRACT

A method for matching neural network layouts to hardware architectures is provided. The method comprises iteratively: holding neural network parameters constant while changing a hardware architecture parameters, calculating a first loss value for a combination of the neural network parameters and hardware architecture parameters according to a gradient-based differentiable function within specified resource constraints, holding the hardware architecture parameters constant while changing the neural network parameters, calculating a second loss value for a new combination of parameters within the specified resource constraints, and combining the first loss value and the second loss value to calculate a combined loss value. The above iterative steps are stopped when the combined loss value reaches a specified threshold, and an optimal combination of neural network parameters and hardware architecture parameters is determined according to the combined loss value.

20 Claims, 6 Drawing Sheets

ALGORITHMIC ARCHITECTURE CO-DESIGN AND EXPLORATION

CROSS-REFERENCE TO RELATED APPLICATION

This application claims the benefit of U.S. Provisional Application No. 63/072,827 filed Aug. 31, 2020, which is incorporated herein by reference.

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The disclosure relates generally to artificial neural networks, and more specifically to designing neural networks and complementary hardware architectures.

2. Description of the Related Art

In practical application, neural network model performance is measured by more than just accuracy, where resources such as model size, energy of computation, or latency must also be considered. The optimal design of a neural network depends on the target dataset, the set of primitive operations (e.g., convolutional filters, skip-connections, nonlinearity functions, pooling, etc.), how the primitive operations are composed into a neural architecture and optimized, and resource constraints (e.g., cost, accuracy, latency). Historically, the highest performing neural architectures have been found by applying heuristics and large amounts of computation.

Therefore, it would be desirable to have a method and apparatus that take into account at least some of the issues discussed above, as well as other possible issues.

SUMMARY

An illustrative embodiment provides a computer-implemented method for matching neural network layouts to hardware architectures. The method comprises iteratively: holding a number of neural network parameters constant while changing a number of hardware architecture parameters, calculating a first loss value for a combination of the neural network parameters and hardware architecture parameters according to a gradient-based differentiable function within specified resource constraints; holding the hardware architecture parameters constant while changing the neural network parameters, calculating a second loss value for a new combination of neural network parameters and hardware architecture parameters according to the gradient-based differentiable function within the specified resource constraints, and combining the first loss value and the second loss value to calculate a combined loss value. The above iterative steps are stopped when the combined loss value reaches a specified threshold, and an optimal combination of neural network parameters and hardware architecture parameters is determined according to the combined loss value.

Another illustrative embodiment provides a system for matching neural network layouts to hardware architectures. The system comprises a storage device configured to store program instructions and one or more processors operably connected to the storage device and configured to execute the program instructions to cause the system to: iteratively: hold a number of neural network parameters constant while changing a number of hardware architecture parameters; calculate a first loss value for a combination of the neural network parameters and hardware architecture parameters according to a gradient-based differentiable function within specified resource constraints; hold the hardware architecture parameters constant while changing the neural network parameters; calculate a second loss value for a new combination of neural network parameters and hardware architecture parameters according to the gradient-based differentiable function within the specified resource constraints; combine the first loss value and the second loss value to calculate a combined loss value; stop the above iterative steps when the combined loss value reaches a specified threshold; and determine an optimal combination of neural network parameters and hardware architecture parameters according to the combined loss value.

Another illustrative embodiment provides a computer program product for matching neural network layouts to hardware architectures. The computer program product comprises a computer-readable storage medium having program instructions embodied thereon to perform the steps of: iteratively: holding a number of neural network parameters constant while changing a number of hardware architecture parameters; calculating a first loss value for a combination of the neural network parameters and hardware architecture parameters according to a gradient-based differentiable function within specified resource constraints; holding the hardware architecture parameters constant while changing the neural network parameters; calculating a second loss value for a new combination of neural network parameters and hardware architecture parameters according to the gradient-based differentiable function within the specified resource constraints; combining the first loss value and the second loss value to calculate a combined loss value; stopping the above iterative steps when the combined loss value reaches a specified threshold; and determining an optimal combination of neural network parameters and hardware architecture parameters according to the combined loss value.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that neural network model performance is measured by more than just accuracy. The optimal design of a neural architecture model depends on the target dataset, the set of primitive operations, how the primitive operations are composed into a neural architecture and optimized, and resource constraints (e.g., cost, accuracy, latency).

Optimizing for the joint architecture space of neural network and hardware is a co-design problem. The illustrative embodiments extend a gradient-based NAS methodology to incorporate hardware costs into the loss function driving the search. This approach has enabled integration of multiple hardware architecture costs provided via an analytical hardware cost model. Doing so extends the co-design search to that of a multi-objective optimization. Additionally, the illustrative embodiments can incorporate satisficing constraints defined by the desired computational workloads and operational conditions.

The illustrative embodiments provide an algorithmic architectural analysis method utilizing hardware cost modeling with neural architecture search (NAS) to explore neural network and hardware architecture co-design. NAS is an algorithmic approach to automate the search for neural architectures. In this context, neural "architecture" describes the configuration of a neural network algorithm (the layout of how artificial neurons are connected to perform computation). Effectively, NAS employs various search techniques to explore configurations of neural network algorithms to seek high performing combinations. A computational architecture describes the configuration and functionality of hardware components. Computational architecture design choices impact the efficiency with which algorithms are executed.

Optimizing for the joint architecture space of neural network and hardware is a co-design problem. The illustrative embodiments extend a gradient-based NAS methodology to incorporate hardware costs into the loss function driving the search. This approach has enables integration of multiple hardware architecture costs provided via an analytical hardware cost model. Doing so extends the co-design search to that of a multi-objective optimization. Additionally, the illustrative embodiments can incorporate satisficing constraints defined by the desired computational workloads and operational conditions.

The algorithmic architectural analysis method of the illustrative embodiments enables multi-objective co-design optimization accounting for satisficing constraints defined by a target application and operational constraints. This capability can yield either neural network algorithms tailored to target hardware architectures or a jointly explored algorithm and architecture solution.

Figure 1:
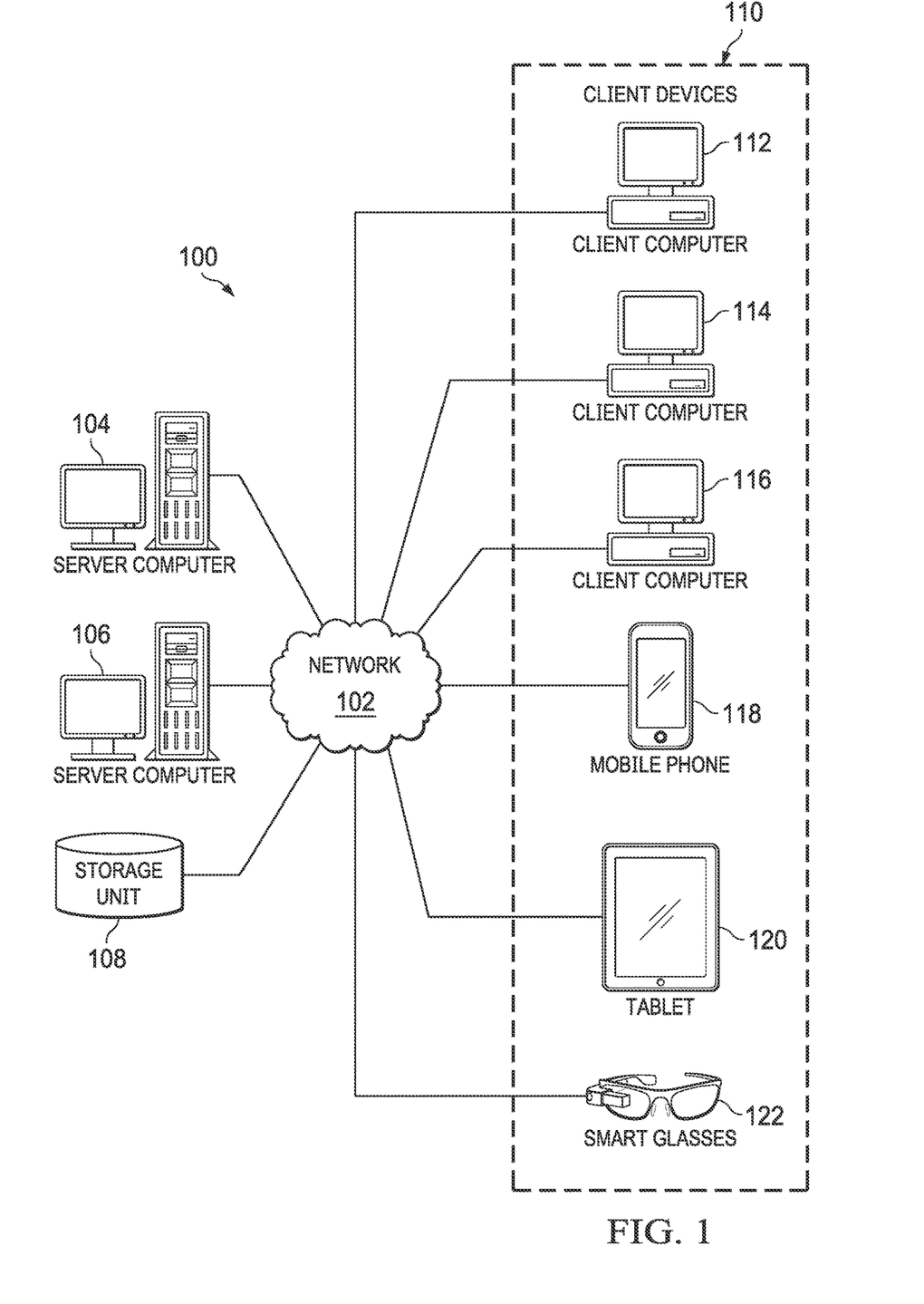
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart devices 122. Smart devices 122 might include any kind of IoT devices, e.g., smart glass (shown), camera, smart devices, smart appliance, or any kind of OT type devices, e.g., remote terminal unit (RTU), intelligent electronic device (IED), or sensors.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), an OT network, or a wide area network (WAN). FIG. 1 is intended as an example, and not as an architectural limitation for the different illustrative embodiments.

Figure 2:
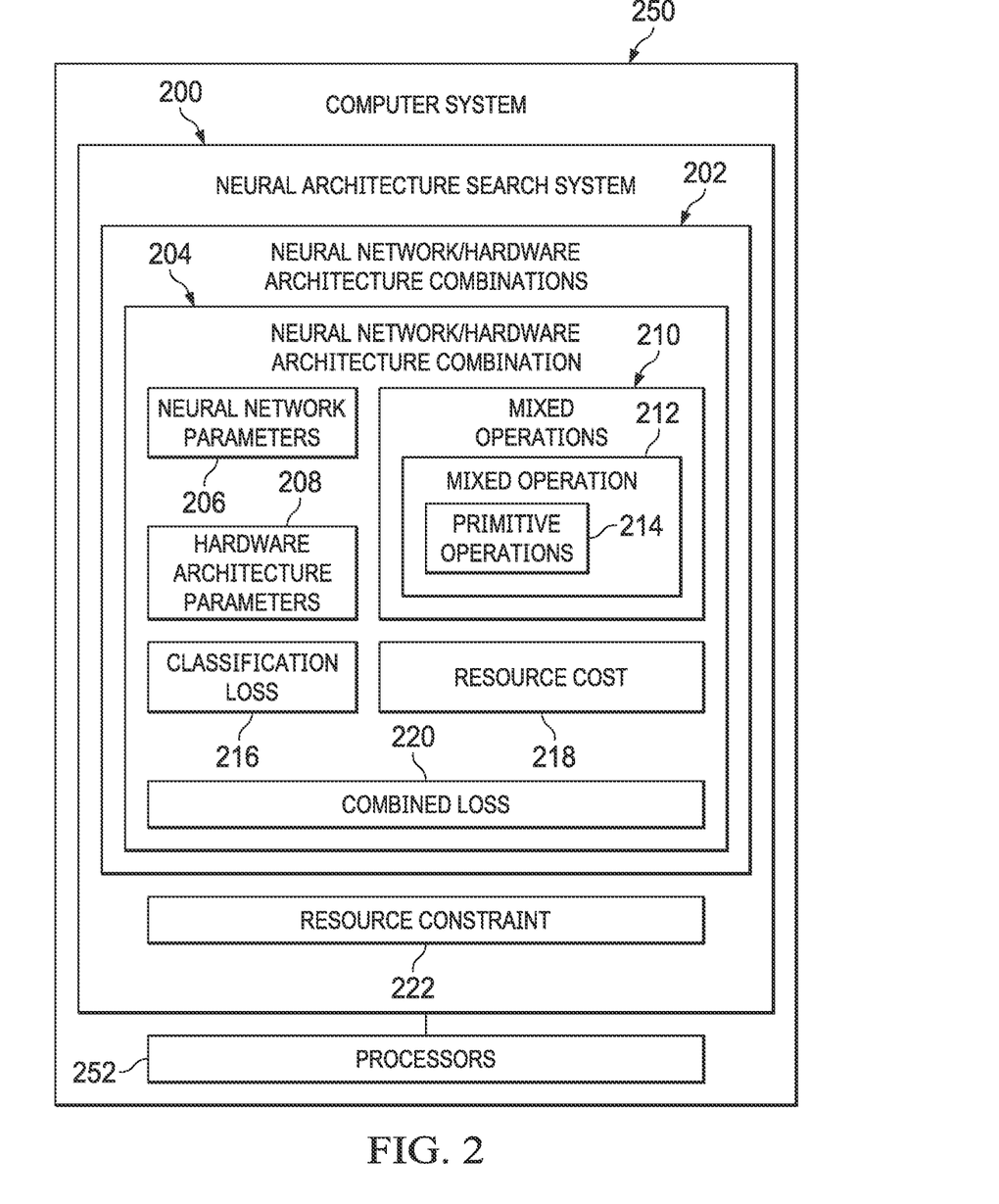
FIG. 2 depicts a neural architecture search (NAS) in accordance with an illustrative embodiment.

FIG. 2 depicts a neural architecture search (NAS) in accordance with an illustrative embodiment. NAS system 200 may be implemented in network data processing system 100 shown in FIG. 1.

NAS system 200 evaluates different combinations 202 of neural network designs and hardware architectures. Each neural network/hardware architecture combination 204 comprises a number of neural network parameters 206 and hardware architecture parameters 208.

NAS system 200 evaluates the combined loss 220 for each neural network/hardware architecture combination 204 against specified resource constraints 222. Resource constraints 222 are used to evaluate the different neural network/hardware architecture combinations 202 and compare them to each other to find optimal combinations.

Each neural network/hardware architecture combination 204 has a classification loss 216 representing the predictive accuracy of the neural network and resource cost 218 incurred by the neural network in order to achieve that accuracy. Classification loss 216 and resource cost 218 can be added to produce combined cost 220 for the neural network/hardware architecture combination 204.

NAS system 200 evaluates the combined loss 220 for each neural network/hardware architecture combination 204 against specified resource constraints 222. Resource constraints 222 used to evaluate the different neural network/hardware architecture combinations 202 and compared them to each other to find optimal combinations.

NAS system 200 can be implemented in software, hardware, firmware, or a combination thereof. When software is used, the operations performed by NAS system 200 can be implemented in program code configured to run on hardware, such as a processor unit. When firmware is used, the operations performed by NAS system 200 can be implemented in program code and data and stored in persistent memory to run on a processor unit. When hardware is employed, the hardware may include circuits that operate to perform the operations in NAS system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for NAS system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, NAS system 200 can run on one or more processors 252 in computer system 250. As used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Figure 3:
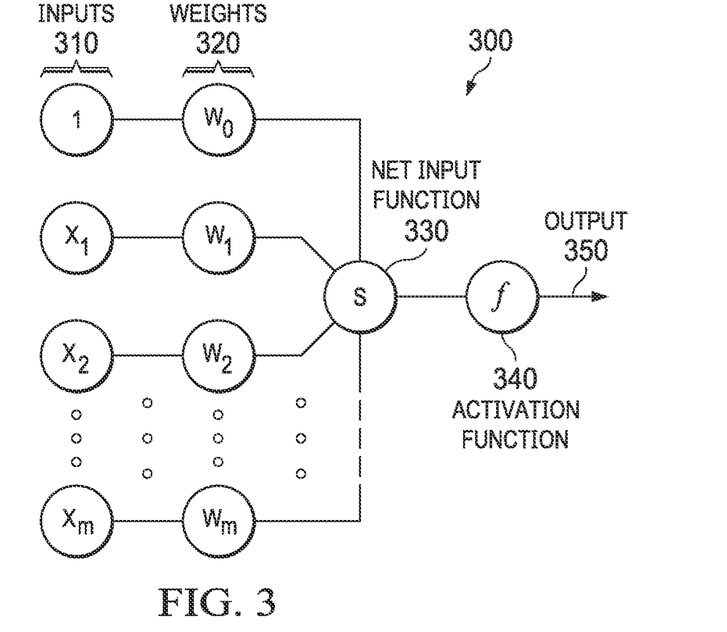
FIG. 3 depicts a diagram illustrating a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
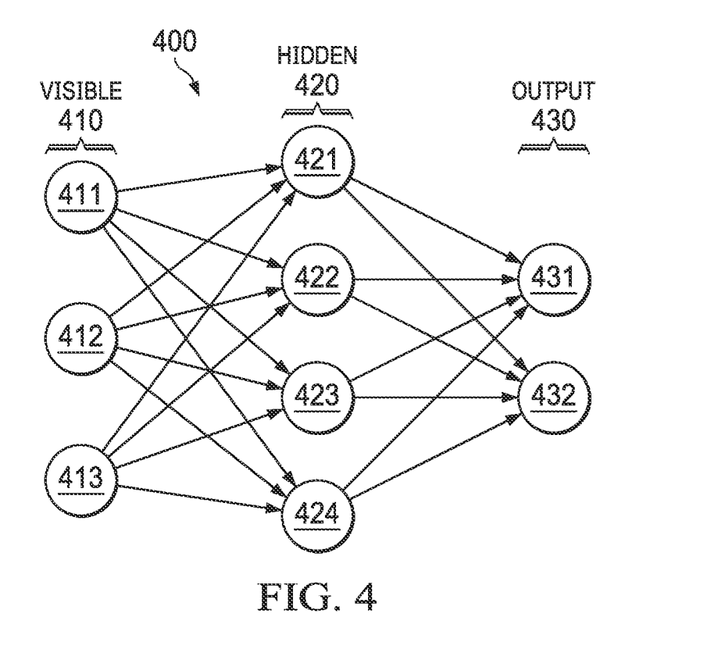
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The visible nodes 410 are those that receive information from the environment (i.e., a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 receives input from all of the visible nodes 411, 412, and 413 each x value from the separate nodes is multiplied by its respective weight, and all of the products are summed. The summed products are then added to the hidden layer bias, and the result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

Artificial neural networks are configured to perform particular tasks by considering examples, generally without task-specific programming. The process of configuring an artificial neural network to perform a particular task may be referred to as training. An artificial neural network that is being trained to perform a particular task may be described as learning to perform the task in question.

A typical process for training an artificial neural network may include providing an input having a known desired output. The input is propagated through the neural network until an output is produced at the output layer of the network. The output is then compared to the desired output, using a loss function. The resulting error value is calculated for each of the artificial neurons (nodes) in the output layer of the neural network. The error values are then propagated from the output back through the artificial neural network, until each artificial neuron in the network has an associated error value that reflects its contribution to the original output. Backpropagation uses these error values to calculate the gradient of the loss function. This gradient is used by an optimization method to update the weights in the artificial neural network in an attempt to minimize the loss function. This process of propagation and weight update is then repeated for other inputs having known desired outputs.

Gradient descent is an optimization algorithm that attempts to find a global minimum of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

An artificial neural network may be implemented as a neural network model running on conventional computer processor hardware, such as a central processor unit (CPU) and a graphical processor unit (GPU). Alternatively, an artificial neural network may be implemented on neuromorphic hardware. Neuromorphic hardware may comprise very-large-scale integration (VLSI) systems containing electronic analog circuits that mimic neuro-biological architectures present in the nervous system. Neuromorphic hardware may include analog, digital, mixed-mode analog and digital VLSI, and software systems that implement models of neural systems. Neuromorphic hardware may thus be used to implement artificial neural networks directly in hardware. An artificial neural network implemented in neuromorphic hardware may be faster and more efficient than running a neural network model on conventional computer hardware.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

The illustrative embodiments employ supervised machine learning, which comprises providing the system with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data.

Figure 5:
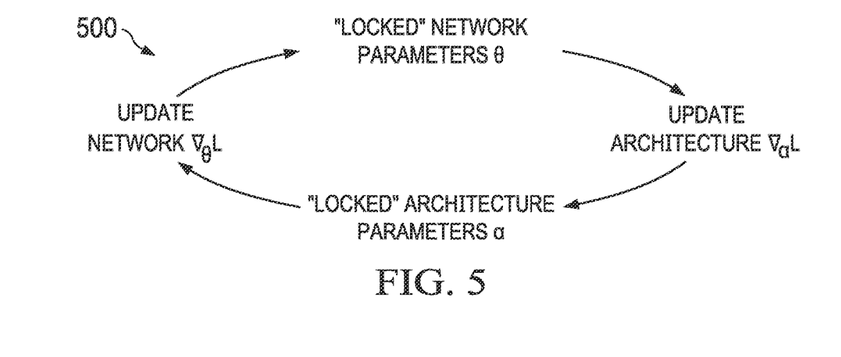
FIG. 5 depicts a diagram illustrating gradient-based NAS (GBNAS) process in accordance with an illustrative embodiment.

Process 500 maintains two sets of parameters. Neural network parameters are represented by $\theta$ and architecture parameters are represented by $\alpha$. GBNAS algorithms leverage differentiable functions, parameterized by architecture parameters, to design deep neural networks, which are parameterized by network parameters. The first-order optimization search process alternates between temporarily fixing ("locking") one set of parameters, i.e., assuming they are constants, and then updating the other set of parameters in an alternating, iterative manner.

FIG. 5 depicts a diagram illustrating gradient-based NAS (GBNAS) process in accordance with an illustrative embodiment. GBNAS methods have the benefit of being directly optimized through gradient descent and consequently complete the search faster than other NAS methods.

Process 500 maintains two sets of parameters. Neural network parameters are represented by $\theta$ and architecture parameters are represented by $\alpha$. GBNAS algorithms leverage differentiable functions, parameterized by architecture parameters, to design deep neural networks, which are parameterized by network parameters. The first-order optimization search process alternates between temporarily fixing ("locking") one set of parameters, i.e., assuming they are constants, and then updating the other set of parameters in and alternating, iterative manner.

When training a neural network for classification, the goal is to obtain a model that best predicts labels from observations drawn from an underlying distribution of interest. Fitting a neural model to an underlying distribution is achieved by finding optimal network parameters $\theta$ that minimize expected prediction error on an available dataset.

GBNAS introduces another set of hardware architecture parameters $\alpha$, producing:

$$g(x;\theta,\alpha) \quad \text{Eq.1}$$

where g is a directed acyclic graph, or simply graph, to highlight that it is composed of a neural network whose control flow is modified by other non-network architecture parameters. Note that g is parameterized by both network and hardware architecture parameters.

Like network parameters, hardware architecture parameters are scalar-valued tensors. Hardware architecture parameters are used to control either the weight of primitive operations, or the probability primitive operations will take place. In both cases, the scalar values are at least interpreted as one or more probability distributions through processing by the softmax (normalizing) function. In the illustrative embodiments, the probability distribution is then used for evaluation of a mixed operation.

Mixed operations may evaluate N primitive operations in parallel and designed such that their outputs are additively conformable. In practice, many mixed operations may be used, with unique subsets of $\theta$ and $\alpha$ used for the calculation of each expected value. The inclusion of hardware architecture parameters implies two optimizations. Graph evaluation g(x, α; θ) denotes that the graph is evaluated at input and hardware architecture parameter constants (x, α) and optimized using network parameters θ. Graph evaluation g(x, θ; α) denotes that the graph is evaluated at input and network parameter constants (x, θ) and optimized using network parameters α. When using first-order differentiable methods, the illustrative embodiments perform a bilevel optimization by locking one set of parameters and updating the other set of parameters with gradient descent.

Figure 6:
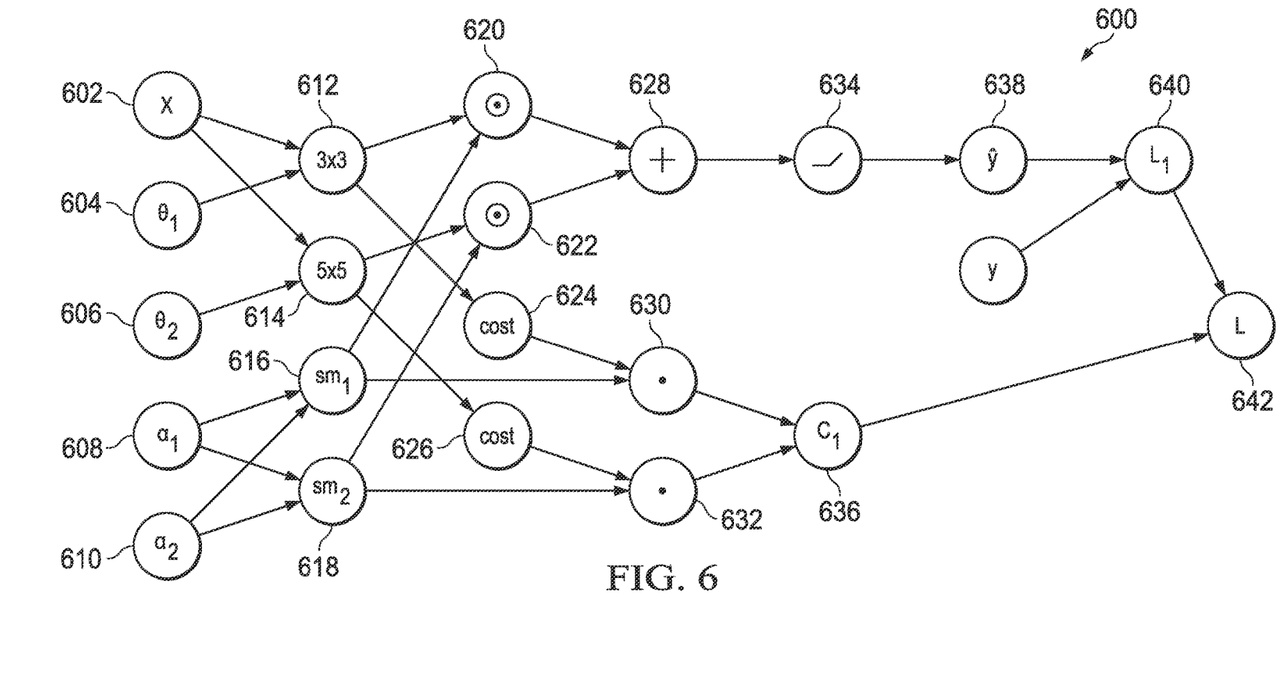
FIG. 6 depicts a diagram illustrating a resource aware progressive differential architecture search process in accordance with an illustrative embodiment.

FIG. 6 depicts a diagram illustrating a resource aware progressive differential architecture search (RAPDARTS) process in accordance with an illustrative embodiment. RAPDARTS process 600 is a specific implementation of process 500 shown in FIG. 5.

Process 600 employs mixed operations to compute multiple primitive operations in parallel, followed by element-wise summation. The mixed operations are scaled by architecture parameters prior to summation. The illustrated example uses a convolutional network, but it should be noted that process 600 is generally applicable to other types of neural networks. In the present example, a 3×3 convolutional filter 612 and a 5×5 convolutional filter 614 may be designed such that both receive the same input feature map x 602 and both generate additively conformable output feature maps.

Convolutional filters are parameterized by neural network tensors $\theta_1$ 604 and $\theta_2$ 606, respectively. The output feature maps of the primitive operations 612, 614 are then element-wise scaled 620, 622 by the softmax functions $sm_1$ 616 and $sm_2$ 618 of hardware architecture parameters $\alpha_1$ 608 and $\alpha_2$ 610. The scaled output feature maps are then added 628, thereby creating a mixed operation 634. For ease of illustration, the present example shows a network with only primitive operations followed by a nonlinearity, producing an output prediction ŷ 638 from which a gradient loss term $L_1$ 640 is calculated based on expected answer y. In practice, there may be several mixed operations, each containing many primitive operations, forming a deep network.

Process 600 also calculates an expected resource cost loss term $C_1$ 636 for each mixed operation to discover neural network designs biased toward the satisfaction of resource constraints. The probabilities used in the mixed operation calculation are also conducive to calculating the expected value of various resource costs. For example, if there are respective cost functions 624, 626 that take as input the description of each primitive operation 612, 614 (including the input feature map dimension information) and output respective resource costs, they may be multiplied 630, 632 by the softmax functions $sm_1$ 616 and $sm_2$ 618 and combined to calculated an expected resource cost $C_1$ 636 of the mixed operation 634. The cost function may be an analytical function, e.g., number of bytes required by the model, or the cost function may be based on a simulation or a surrogate model trained from data collected from a physical device. The expected resource cost of the mixed operation is differentiable with respect to the mixed operation's hardware architecture parameters $\alpha_1$ 608 and $\alpha_2$ 610.

When the gradient of the expected resource cost is calculated, the more expensive primitive operations are penalized more heavily than less expensive operations, but the penalty is balanced by how much the primitive operation contributes to classification accuracy.

The sum of the expected mixed operations costs can be denoted as:

$$C_m = \Sigma_{k=1}^n E[\text{cost}_m(O_k(x_k))] \quad \text{Eq. 2}$$

where n is the number of mixed operations, O is the expected value of the primitive operations, k is the mixed operation index, and m corresponds to a unique resource cost. For example, $C_1$ might be the sum of expected mixed operation parameter sizes, and $C_2$ might be the sum of expected mixed operation latencies.

The sum L 642 of the classification and resource losses are denoted as:

$$L = L_1 + \Sigma_{m=1}^M \lambda_m C_m \quad \text{Eq. 3}$$

where M is the number of resource costs to satisfy, and $\lambda_m$ is the resource cost hyperparameter and controls how important the resource cost m is compared to accuracy as well as other resource costs.

Figure 7:
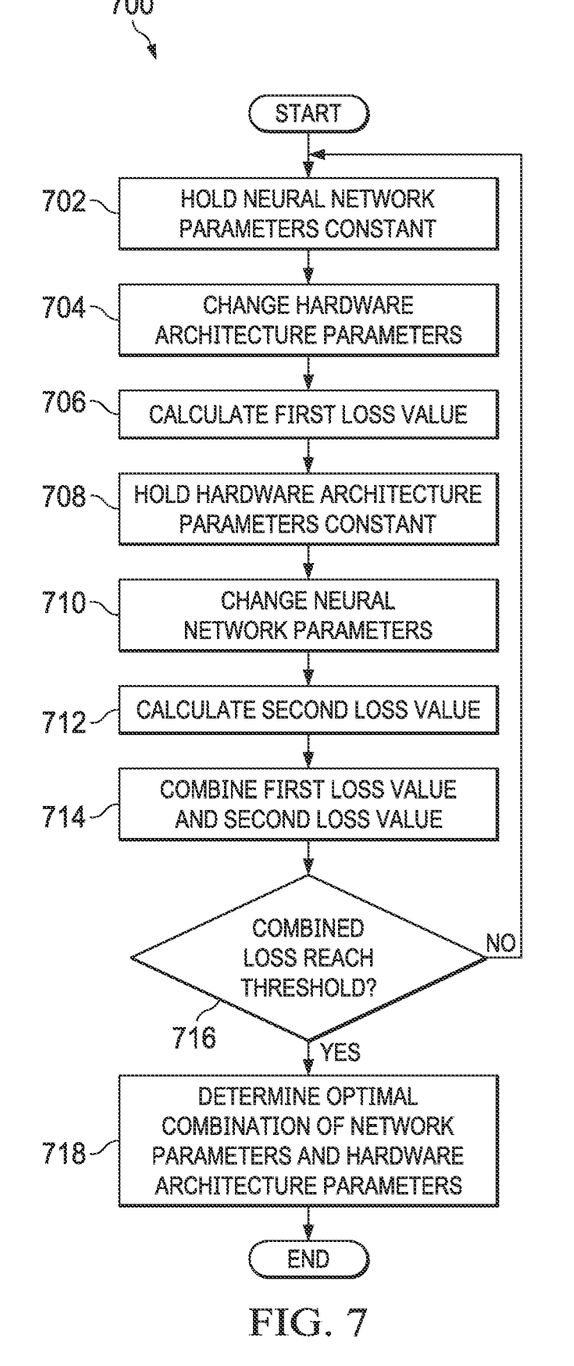
FIG. 7 depicts a flowchart illustrating a gradient descent process for matching neural network layouts to hardware architectures in accordance with an illustrative embodiment.

FIG. 7 depicts a flowchart illustrating a gradient decent process for matching neural network layouts to hardware architectures in accordance with an illustrative embodiment. Process 700 can be implemented in hardware, software, or both. When implemented in software, the process can take the form of program code that is run by one or more processor units located in one or more hardware devices in one or more systems. Process 700 may employ RAPDARTS process 600 and might be implemented in network data processing system 100 in FIG. 1 and NAS system 200 in FIG. 2.

Process 700 then holds the hardware architecture parameters constant (step 708) while changing the neural network parameters (step 710). Process 700 then calculates a second loss value for a new combination of neural network parameters and hardware architecture parameters according to the gradient-based differentiable function within the specified resource constraints (step 712). Calculating the first and second loss values for a combination of neural network parameters and hardware architecture parameters may comprise performing a number of primitive operations in parallel, wherein output of the primitive operations are additively conformable.

Process 700 then holding the hardware architecture parameters constant (step 708) while changing the neural network parameters (step 710). Process 700 then calculates a second loss value for a new combination of neural network parameters and hardware architecture parameters according to the gradient-based differentiable function within the specified resource constraints (step 712). Calculating the first and second loss values for a combination of neural network parameters and hardware architecture parameters may comprise performing a number of primitive operations in parallel, wherein output of the primitive operations are additively conformable The first loss value and the second loss value are combined to calculate a combined loss value (step 714), and the determination is made if the combine loss value reached a specified threshold (step 716). If the combined loss value has not reached the threshold, process 700 returns to step 702 and iterates again.

The iterative steps stop when the combined loss value reaches a specified threshold, and an optimal combination of neural network parameters and hardware architecture parameters is determined according to the combined loss value (step 718). Process 700 then ends.

Figure 8:
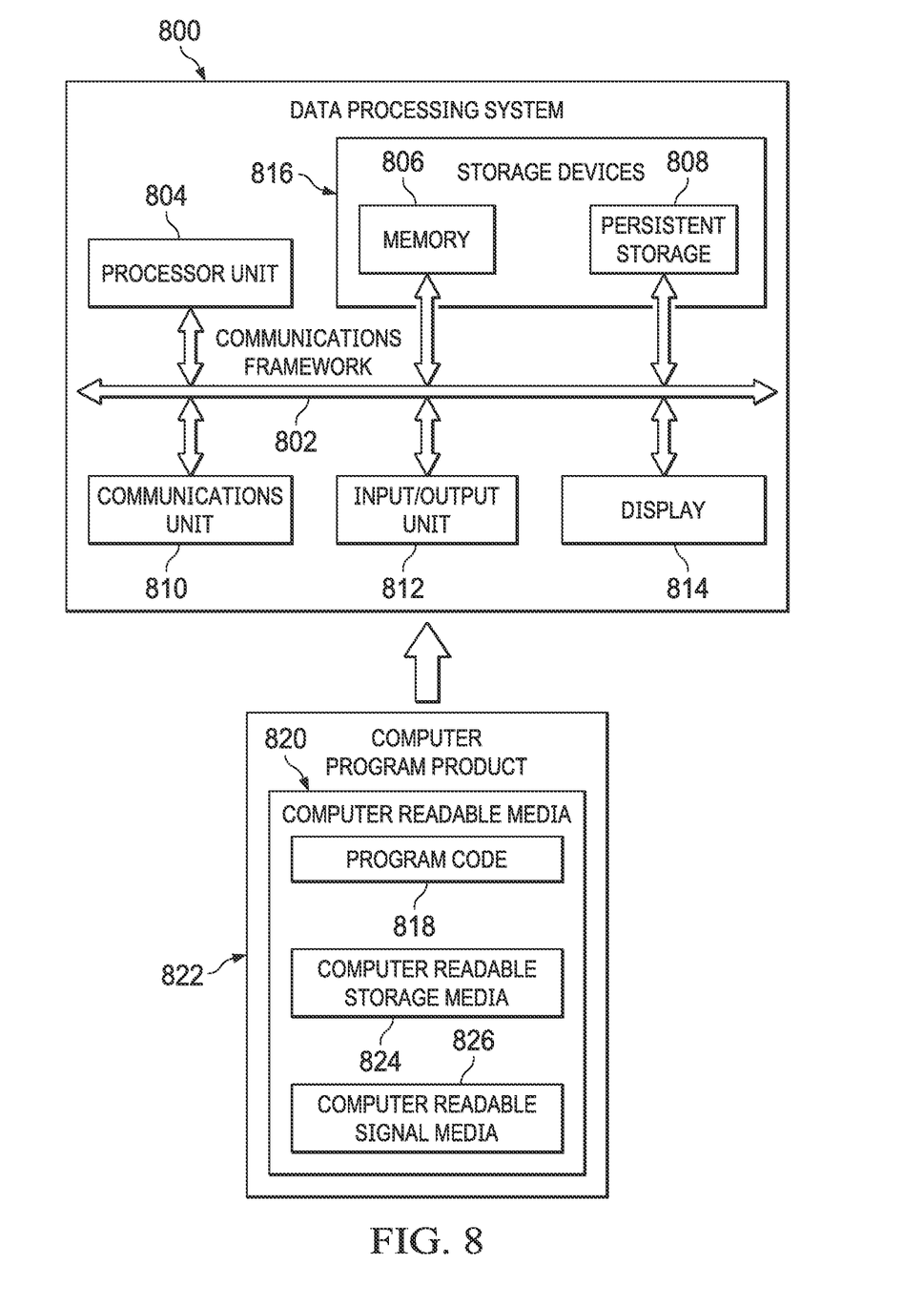
FIG. 8 is a diagram of a data processing system depicted in accordance with an illustrative embodiment.

Turning now to FIG. 8, an illustration of a block diagram of a data processing system is depicted in accordance with an illustrative embodiment. Data processing system 800 may be used to implement one or more computers shown in FIG. 1 (e.g., client devices 110 and servers 104, 106) and computer system 250 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (GPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 816, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for matching neural network layouts to hardware architectures, the method comprising:
    using a number of processors to perform the steps of:
        iteratively:
            holding a number of neural network parameters constant while changing a number of hardware architecture parameters;
            calculating a first loss value for a combination of the neural network parameters and hardware architecture parameters according to a gradient-based differentiable function within specified resource constraints;
            holding the hardware architecture parameters constant while changing the neural network parameters;
            calculating a second loss value for a new combination of neural network parameters and hardware architecture parameters according to the gradient-based differentiable function within the specified resource constraints;
            combining the first loss value and the second loss value to calculate a combined loss value;
        stopping the above iterative steps when the combined loss value reaches a specified threshold;
        determining an optimal combination of neural network parameters and hardware architecture parameters according to the combined loss value; and
        generating a neural network algorithm tailored to a target hardware architecture according to the optimal combination of neural network parameters and hardware architecture parameters.

2. The method of claim 1, wherein the gradient-based differential function comprises a resource aware progressive differentiable search function.

3. The method of claim 1, wherein the specified resource constraints comprise at least one of:
    size;
    weight;
    power;
    accuracy;
    energy of computation;
    minimum throughout;
    maximum latency; or
    manufacturing budget.

4. The method of claim 1, wherein calculating the first loss value or second loss value for a combination of neural network parameters and hardware architecture parameters comprises performing a number of primitive operations in parallel, wherein output of the primitive operations are additively conformable.

5. The method of claim 4, further comprising combining the primitive operations to form a mixed operation, wherein the first loss value is calculated from an output prediction of the mixed operation compared to an expected answer.

6. The method of claim 5, further comprising:
    calculating resource costs of each primitive operation according to respective cost functions; and
    combining the resource costs of each primitive operation, wherein the second loss value comprises an expected resource cost of the mixed operation.

7. The method of claim 6, wherein the expected cost of the mixed operation is differentiable with respect to the hardware architecture parameters.

8. A system for matching neural network layouts to hardware architectures, the system comprising:
    a storage device configured to store program instructions; and
    one or more processors operably connected to the storage device and configured to execute the program instructions to cause the system to:
        iteratively:
            hold a number of neural network parameters constant while changing a number of hardware architecture parameters;
            calculate a first loss value for a combination of the neural network parameters and hardware architecture parameters according to a gradient-based differentiable function within specified resource constraints;

hold the hardware architecture parameters constant while changing the neural network parameters;

calculate a second loss value for a new combination of neural network parameters and hardware architecture parameters according to the gradient-based differentiable function within the specified resource constraints;

combine the first loss value and the second loss value to calculate a combined loss value;

stop the above iterative steps when the combined loss value reaches a specified threshold;

determine an optimal combination of neural network parameters and hardware architecture parameters according to the combined loss value; and generate a neural network algorithm tailored to a target hardware architecture according to the optimal combination of neural network parameters and hardware architecture parameters.

9. The system of claim 8, wherein the gradient-based differential function comprises a resource aware progressive differentiable search function.

10. The system of claim 8, wherein the specified resource constraints comprise at least one of:
size;
weight;
power;
accuracy;
energy of computation;
minimum throughout;
maximum latency; or
manufacturing budget.

11. The system of claim 8, wherein calculating the first loss value or second loss value for a combination of neural network parameters and hardware architecture parameters comprises performing a number of primitive operations in parallel, wherein output of the primitive operations are additively conformable.

12. The system of claim 11, wherein the processors further execute instructions to combine the primitive operations to form a mixed operation, wherein the first loss value is calculated from an output prediction of the mixed operation compared to an expected answer.

13. The system of claim 12, wherein the processors further execute instructions to:
calculate resource costs of each primitive operation according to respective cost functions; and
combine the resource costs of each primitive operation, wherein the second loss value comprises an expected resource cost of the mixed operation.

14. A computer program product for matching neural network layouts to hardware architectures, the computer program product comprising:
a computer-readable storage medium having program instructions embodied thereon to perform the steps of:
iteratively:
holding a number of neural network parameters constant while changing a number of hardware architecture parameters;

calculating a first loss value for a combination of the neural network parameters and hardware architecture parameters according to a gradient-based differentiable function within specified resource constraints;

holding the hardware architecture parameters constant while changing the neural network parameters;

calculating a second loss value for a new combination of neural network parameters and hardware architecture parameters according to the gradient-based differentiable function within the specified resource constraints;

combining the first loss value and the second loss value to calculate a combined loss value;

stopping the above iterative steps when the combined loss value reaches a specified threshold;

determining an optimal combination of neural network parameters and hardware architecture parameters according to the combined loss value; and generating a neural network algorithm tailored to a target hardware architecture according to the optimal combination of neural network parameters and hardware architecture parameters.

15. The computer program product of claim 14, wherein the gradient-based differential function comprises a resource aware progressive differentiable search function.

16. The computer program product of claim 14, wherein the specified resource constraints comprise at least one of:
size;
weight;
power;
accuracy;
energy of computation;
minimum throughout;
maximum latency; or
manufacturing budget.

17. The computer program product of claim 14, wherein calculating the first loss value or second loss value for a combination of neural network parameters and hardware architecture parameters comprises performing a number of primitive operations in parallel, wherein output of the primitive operations are additively conformable.

18. The computer program product of claim 17, further comprising combining the primitive operations to form a mixed operation, wherein the first loss value is calculated from an output prediction of the mixed operation compared to an expected answer.

19. The computer program product of claim 18, further comprising:
calculating resource costs of each primitive operation according to respective cost functions; and
combining the resource costs of each primitive operation, wherein the second loss value comprises an expected resource cost of the mixed operation.

20. The computer program product of claim 19, wherein the expected cost of the mixed operation is differentiable with respect to the hardware architecture parameters.

* * * * *